US012784456B2

(12) United States Patent
Yarlapati Ganesh et al.

(10) Patent No.: US 12,784,456 B2
(45) Date of Patent: Nov. 3, 2026

(54) PILOT POSTURE RECOGNITION SYSTEM AND METHOD

(71) Applicant: Rockwell Collins, Inc., Cedar Rapids, IA (US)

(72) Inventors: Naresh Yarlapati Ganesh, Cork (IE); Stefano Riverso, Cork City (IE)

(73) Assignee: Rockwell Collins, Inc., Cedar Rapids, IA (US)

( * ) Notice: Subject to any disclaimer, the term of this patent is extended or adjusted under 35 U.S.C. 154(b) by 282 days.

(21) Appl. No.: 18/593,332

(22) Filed: Mar. 1, 2024

(65) Prior Publication Data

US 2024/0331387 A1 Oct. 3, 2024

(30) Foreign Application Priority Data

Mar. 27, 2023 (EP) .................................... 23164433

(51) Int. Cl.

| | |
|---|---|
| ***G06V 20/52*** | (2022.01) |
| ***B64D 45/00*** | (2006.01) |
| ***G06T 7/50*** | (2017.01) |
| ***G06T 7/73*** | (2017.01) |
| ***G06V 10/82*** | (2022.01) |
| ***G06V 40/10*** | (2022.01) |
| ***G06V 40/20*** | (2022.01) |
| ***G08B 21/04*** | (2006.01) |

(52) U.S. Cl.
CPC ............ *G06V 20/52* (2022.01); *B64D 45/00* (2013.01); *G06T 7/50* (2017.01); *G06T 7/73* (2017.01); *G06V 10/82* (2022.01); *G06V 40/10* (2022.01); *G06V 40/20* (2022.01); *G08B 21/0446* (2013.01); *G06T 2207/20084* (2013.01)

(58) Field of Classification Search
CPC ........ G06V 20/52; G06V 40/10; G06V 10/82; G06V 40/20; G06T 7/73; B64D 45/00; G08B 21/0446
USPC .......................................................... 382/103
See application file for complete search history.

(56) References Cited

U.S. PATENT DOCUMENTS

| | | | | |
|---|---|---|---|---|
| 9,002,543 | B2 | 4/2015 | Dorneich et al. | |
| 10,521,683 | B2 * | 12/2019 | Grubb | G06N 20/00 |
| 11,100,316 | B2 | 8/2021 | Porikli et al. | |
| 11,941,894 | B2 * | 3/2024 | Edwards | G06F 18/22 |
| 12,094,316 | B2 * | 9/2024 | Myers | G06V 40/174 |
| 12,198,312 | B2 * | 1/2025 | Noble | G06T 5/90 |
| 2016/0210497 | A1 * | 7/2016 | Rougeaux | G06F 3/013 |
| 2016/0353094 | A1 * | 12/2016 | Rougeaux | G06F 3/0487 |
| 2019/0090800 | A1 | 3/2019 | Bosworth et al. | |

(Continued)

FOREIGN PATENT DOCUMENTS

| | | | |
|---|---|---|---|
| WO | 2021122900 | A1 | 6/2021 |
| WO | 2021198917 | A1 | 10/2021 |

OTHER PUBLICATIONS

European Search Report dated Aug. 1, 2023; European Application No. 23164433.7.

*Primary Examiner* — William D Titcomb
(74) *Attorney, Agent, or Firm* — Suiter Swantz IP

(57) ABSTRACT

A system includes one or more imaging devices configured to collect image data of a cockpit area of an aircraft. The system includes a pilot detection module configured to determine a presence of one or more pilots in the cockpit area based on the image data The system includes a pilot posture module configured to determine three-dimensional posture of the one or more pilots based on the image data.

15 Claims, 5 Drawing Sheets

(56) References Cited

U.S. PATENT DOCUMENTS

| | | | | |
|---|---|---|---|---|
| 2021/0118108 | A1* | 4/2021 | Noble | G06T 5/90 |
| 2021/0287539 | A1 | 9/2021 | Cronje et al. | |
| 2022/0121838 | A1 | 4/2022 | Goyal et al. | |
| 2022/0230522 | A1* | 7/2022 | Myers | A61B 5/18 |
| 2022/0265187 | A1 | 8/2022 | Salmon-Legagneur et al. | |
| 2023/0211892 | A1* | 7/2023 | Feyereisen | B64D 43/00 701/3 |
| 2024/0059220 | A1* | 2/2024 | Noble | G02F 1/1685 |

* cited by examiner

PILOT POSTURE RECOGNITION SYSTEM AND METHOD

CROSS-REFERENCE TO RELATED APPLICATIONS

The present application claims the benefit of European Patent Application No. 23164433.7, entitled PILOT POSTURE RECOGNITION SYSTEM AND METHOD, filed Mar. 27, 2023, which is incorporated by reference in the entirety.

TECHNICAL FIELD

The subject-matter disclosed herein relates to a pilot posture recognition system, e.g., in a cockpit of an aircraft. Particularly, the subject-matter disclosed herein relates to systems and methods for the detection/recognition of pilot posture, pilot position, pilot fall and pilot-object interaction.

BACKGROUND

Pilot state assessment systems may be used to assess the state of a pilot and/or co-pilot during operation of an aircraft. The position and posture of a pilot and/or co-pilot is an important factor for identifying/predicting fatigue and incapacitation situations during a flight—for example, slouching and/or a loose head position (e.g., neck bending) can be indicators that a pilot is tired or asleep. Thus, the inventors have identified a need for an improved pilot monitoring system to better detect and recognise the state/activity of a pilot and/or a co-pilot.

SUMMARY

In a first aspect, there is provided a system comprising: one or more imaging devices configured to collect image data of a cockpit area of an aircraft; a pilot detection module configured to determine a presence of one or more pilots in the cockpit area based on the image data; and a pilot posture module configured to determine three-dimensional posture of the one or more pilots based on the image data.

As used herein, the term 'module' should be understood to mean a 'software module', e.g., a software component comprising code corresponding to a part of or a whole of a program. A module is configured to be executed by/run on one or more processors of the system.

The pilot posture module may be capable of determining that a pilot is falling or has fallen.

The one or more imaging devices may include at least one conventional charged-coupled device (CCD) or complementary metal-oxide semiconductor (CMOS) based digital camera having a two-dimensional array of photosensitive pixels, optionally provided with the capability to determine range or depth (such as through one or more phase detect elements). The photosensitive pixels are capable of sensing electromagnetic radiation in the visible wavelength range. Alternatively, the one or more imaging devices may include at least one three-dimensional camera such as a time-of-flight camera (e.g., a camera comprising, or associated with, a time-of-flight sensor including, for example, an infrared (IR) emitter and receiver) or other scanning or range-imaging camera capable of imaging a scene in three dimensions. Alternatively, the one or more imaging devices may include a pair of like two-dimensional cameras operating in a stereo configuration and calibrated to extract depth. The one or more imaging devices comprise a two-dimensional digital camera configured to image in the visible wavelength range and a time-of-flight sensor (depth sensor), optionally including an IR emitter and receiver.

The one or more imaging devices may comprise a plurality of two-dimensional digital cameras configured to image in the visible wavelength range and a plurality of time-of-flight sensors, optionally each including an IR emitter and receiver.

The modules and models of the system described herein may be configured (e.g., trained) to process/handle image data from a number of different imaging device configurations. In other words, the modules and models may be presented (during training) with a plurality of different view configurations of the cockpit, each view configuration comprising one or more image views (with each image view being provided by a particular imaging device in a particular position). In this way, the modules of the system may be configured to be 'viewed independently', in that they can process/handle image data from any imaging device configuration (i.e., one or more imaging devices arranged in any position(s)) and yet still provide robust and accurate evaluations of the scene in the cockpit.

The system may include a data buffer (or frame buffer) to temporarily store the image data. The image data may be provided from the data buffer to one or more modules of the system, the one or more modules being configured to process the data and derive conclusions. As described above, the system may comprise one or more processors on which the one or more modules may be run.

The pilot detection module may comprise a pre-trained pilot detection machine learning model. In other words, the pilot detection machine learning model may be an object detection model configured (e.g., trained) to detect/identify a person (e.g., a pilot) in the cockpit.

The system may comprise an object detection image module configured to determine a presence and three-dimensional position of one or more objects in the cockpit area based on the image data. In the present context, an 'object' is understood to refer to inanimate cockpit objects, and in particular to flight deck objects. Relevant objects may include, for example, control levers, control panels including buttons and switches, sidesticks, control pedals, and control wheels/yokes/tillers.

The object detection module may comprise a pre-trained flight deck object detection machine learning model. In other words, the flight deck object machine learning model may be configured (e.g., trained) to detect/identify an object (e.g., a control stick of a flight deck) in the cockpit.

The system may comprise a pilot-object module configured to, if the pilot posture module detects that one or more pilots have fallen, determine that a pilot-object interaction event has occurred based on the three-dimensional posture of the one or more pilots and the three-dimensional positions of the one or more objects.

Detection of a pilot-object interaction may be carried out by a pre-trained long short-term memory (LSTM) network model. Herein, an LSTM network model is a deep neural network model capable of remembering a plurality of past image frames, and predicting a plurality of future image frames. The pilot-object LSTM network model may have been pre-trained using a dataset comprising videos of pilot interactions with flight deck objects.

The system may be configured to pass the determined three-dimensional posture and/or the determined pilot-object interaction event to an alert system.

The alert system may be configured to: verify that an action has been input into a flight system log of the aircraft as a result of the determined pilot-object interaction event; and alert a control system of the aircraft that the action input was a result of the determined pilot-object interaction event.

The alert system may be configured to alert aircraft crew and/or ground control and/or Air Traffic Control that one or more pilots have fallen.

The pilot posture module may comprise a depth information module configured to extract depth information from the image data; and a pilot pose module configured to identify a plurality of two-dimensional keypoints corresponding to features of the one or more pilots in the image data, where the pilot posture module is configured to combine the depth information and the two-dimensional keypoints to determine a three-dimensional posture of the one or more pilots in the cockpit.

The pilot pose module may identify the plurality of two-dimensional keypoints by use of a pre-trained human pose estimation model.

The two-dimensional keypoints may comprise the location of the pilot's eyes, ears, nose, shoulders, elbows, wrists, and hips.

Determination of the three-dimensional posture of the one or more cockpits may be carried out by a pre-trained LSTM network model. The pilot posture LSTM network model may have been pre-trained using a dataset comprising images and videos e.g. of one or more pilots in the cockpit.

The LSTM network model may be configured (e.g., trained) to determine feature relationships between key points (i.e., the three-dimensional distance and angles between them) and to utilise the determined feature relationships to identify a three-dimensional posture. During (pre-)training, the LSTM network model will learn to recognize or classify different postures based on characteristic/distinctive feature relationships.

In another aspect, there is provided a method, comprising: collecting, using one or more imaging devices, image data of a cockpit area of an aircraft; determining, using a pilot detection module, a presence of one or more pilots in the cockpit area based on the image data; and determining, using a pilot posture image module, three-dimensional posture of the one or more pilots based on the image data.

The method may comprise use of the system of the first aspect, optionally including any of the optional features thereof.

The method may comprise determining, using the pilot posture recognition module, that a pilot is falling or has fallen.

The method may comprise determining, using an object detection image module, a presence and three-dimensional position of one or more objects in the cockpit area based on the image data.

After determining that one or more pilots have fallen, the method may comprise determining, using a pilot-object module, that a pilot-object interaction event occurred based on the three-dimensional posture of the one or more pilots and the three-dimensional positions of the one or more objects before and after, and/or during the fall. In other words, if the pilot posture recognition module identifies a fall event of one or more pilots, the pilot-object module will determine (based on the three-dimensional posture of the one or more pilots and the three-dimensional positions of the one or more objects at the time of the fall event) whether a pilot-object interaction event occurred (e.g., identifying whether the pilot(s) knocked any controls as they fell down).

The method may comprise verifying, using an alert system, that an action has been input into a flight system log of the aircraft as a result of the determined pilot-object interaction event; and alerting, using the alert system, a control system of the aircraft that the action input was a result of the determined pilot-object interaction event.

The method may comprise alerting, using an alert system, aircraft crew and/or ground control and/or Air Traffic Control that one or more pilots have fallen.

The method may comprise extracting, using a depth information module of the pilot posture image module, depth information from the image data; identifying, using a pilot pose module of the pilot posture image module, a plurality of two-dimensional keypoints corresponding to features of the one or more pilots in the image data; and combining, using the pilot posture image module, the depth information and the two-dimensional keypoints to determine three-dimensional posture of the one or more pilots in the cockpit.

DETAILED DESCRIPTION

Figure 1:
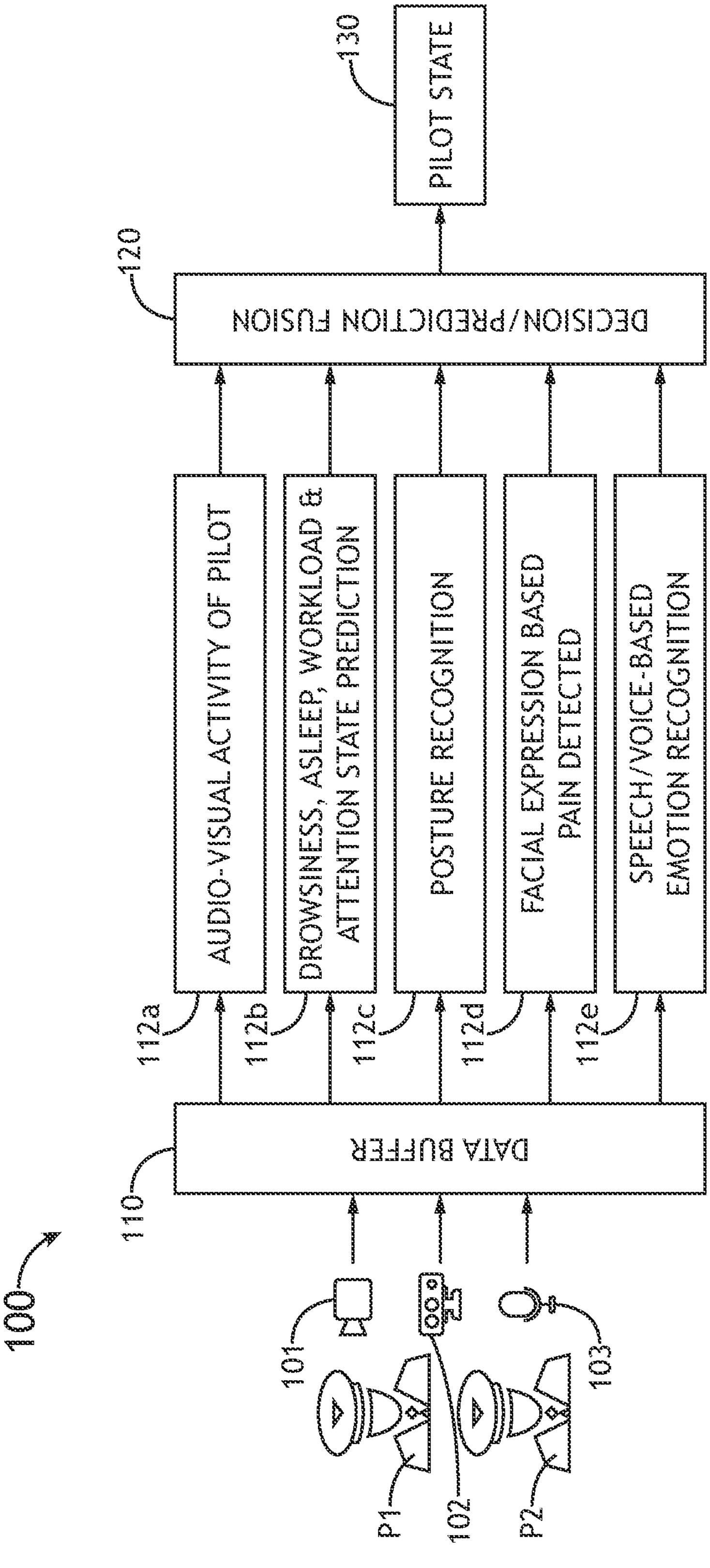
FIG. 1 shows an example of a pilot state monitoring system, in accordance with one or more embodiments of the present disclosure.

FIG. 1 generally shows an example of a pilot state monitoring system 100. The pilot state monitoring system 100 is configured to monitor the activity of one or more pilots (e.g., P1 and P2) during flight. The pilot state monitoring system 100 comprises one or more imaging devices including, for example, a visible light camera 101 and an infrared emitter/receiver 102 which acts as a time of flight detector. Optionally, the pilot state monitoring system 100 may include one or more audio collectors 103 (e.g., a microphone). The infrared/depth camera 102 may assist in extracting and reconstructing a three-dimensional scene of the cockpit where the one or more pilots P1/P2 are situated.

As shown in FIG. 1, data from at least one of the image collector 101, the infrared/depth device 102 and the audio collector 103 may be forwarded to be processed through a data buffer 110 to temporarily store data before it is processed. The data buffer 110 can buffer the data from at least one of the image collector 101, the infrared emitter/receiver 102, and the audio collector 103. The data may then be extrapolated from the data buffer 110 in order to determine the pilot state 130. For example, data may be passed to one of the following subsystems: a) audio-visual pilot activity recognition subsystem 112*a*, b) pilot drowsiness recognition subsystem 112*b*, c) pilot posture recognition subsystem 112*c*, d) pilot pain recognition subsystem 112*d*, and e) pilot emotion recognition subsystem 112*e*. After one or more of these subsystems 112*a*-112*e* have processed the received data, the processed data is sent through to a decision module 120 where the processed data is analysed to determine a pilot state 130.

Figure 2:
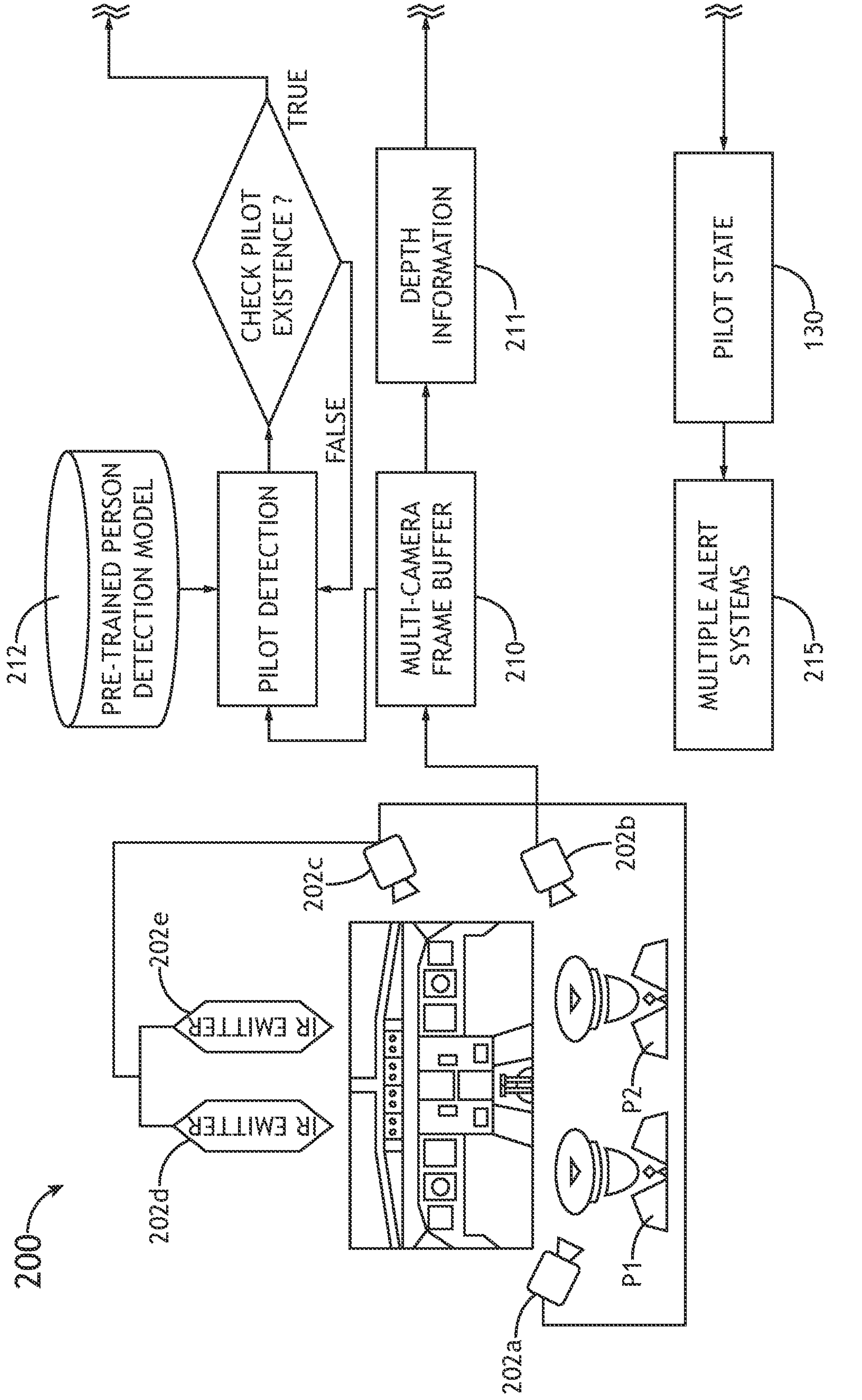
FIG. 2 shows an example of a pilot posture recognition system, in accordance with one or more embodiments of the present disclosure.
Figure 2:
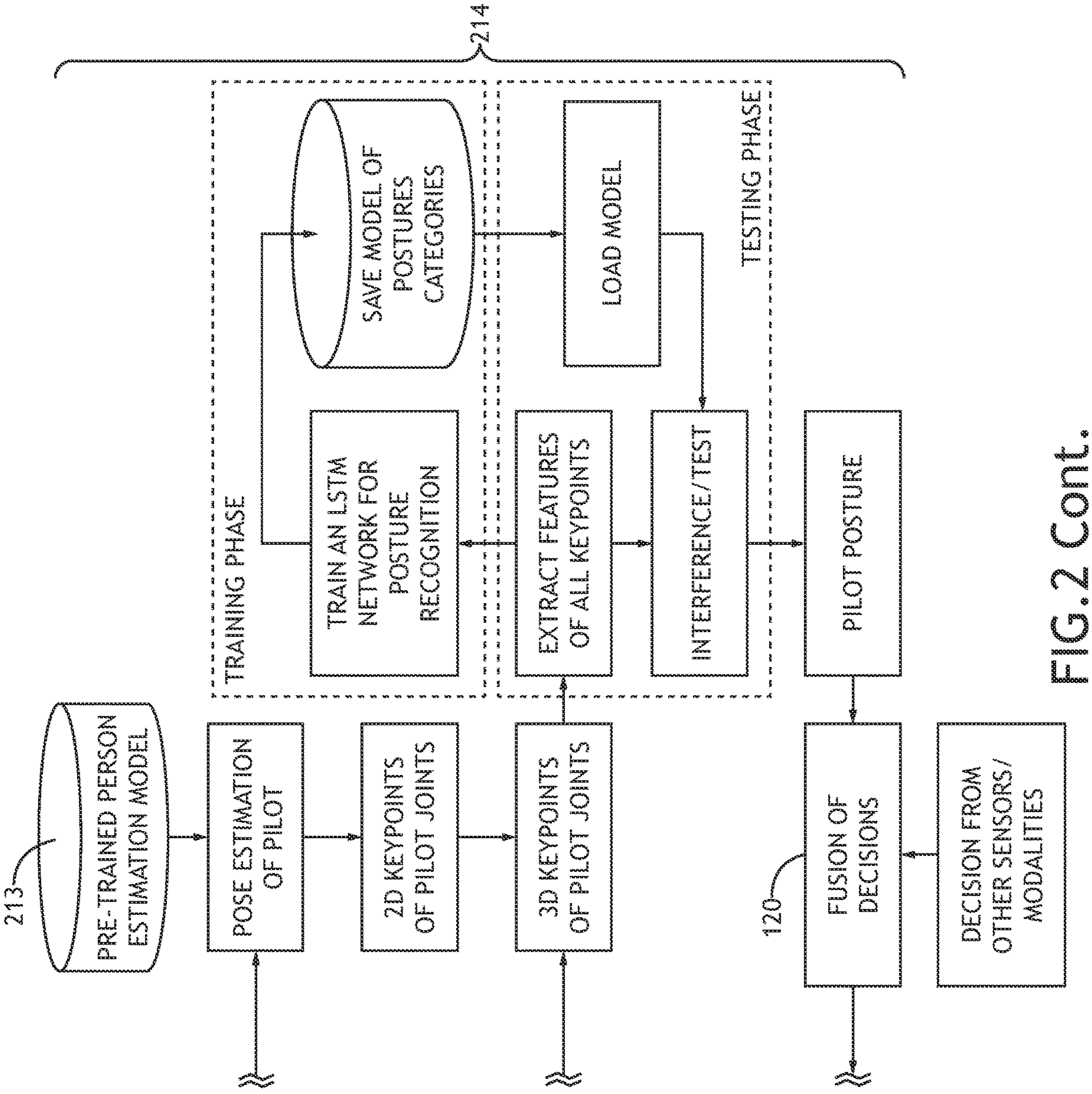

FIG. 2 shows further detail of a pilot posture recognition subsystem 200. As shown in FIG. 2, a cockpit area may include one or more pilots (e.g., P1 and P2).

As shown in FIG. 2, the cockpit area includes one or more imaging devices 202 including three RGB cameras (e.g., 202*a*, 202*b*, 202*c*) and two infrared (IR)/depth sensors (e.g.,

202*d* and 202*e*). In this example, the one or more imaging devices 202 are located to face the front side of the one or more pilots P1 and/or P2. The one or more imaging devices collect image data from the cockpit area, e.g., of the one or more pilots P1, P2. The image data may be taken during flight.

The modules and models of the systems 100, 200 described herein may be configured (e.g., trained) to process/handle image data from a number of different imaging device configurations. In other words, the modules and models may be presented (during training) with a plurality of different view configurations of the pilot(s)/cockpit, each view configuration comprising one or more image views (with each image view being provided by a particular imaging device 202 in a particular position/orientation). In this way, the modules of the system 100, 200 may be configured to be 'viewed independently', in that they can process/handle image data from any imaging device configuration (i.e., one or more imaging devices 202 arranged in any position(s)/orientation(s)) and yet still provide robust and accurate evaluations of the scene in the cockpit.

As can be seen in FIG. 2, the image data is provided to a frame buffer 210 where the image data is temporarily stored for processing. The image data provided to the frame buffer 210 is transposed to two different branches. In the first branch, the image data is provided from the frame buffer 210 to a depth information module 211 that is configured to extract depth information from the image data. In the second branch, the image data is provided to a pilot detection module 212 to determine a presence of one or more of the pilots P1, P2. If the presence of one or more of the pilots P1, P2 is detected, the image data is passed to a pilot pose module 213 to estimate a pose of the one or more pilots P1, P2. The poses are detected by identifying, using a (pre-trained) human pose estimation model, a plurality two-dimensional keypoints corresponding to features of the one or more pilots P1, P2. The keypoint features include the pilot's eyes, nose, ears, shoulders, elbows, wrists, and hips.

The processed image data from the depth information module 211 and the processed image data from the pilot pose module 213 are then combined by the posture position module 214 to create a three-dimensional reconstruction of the pilot's pose (e.g., to determine three-dimensional positions of the keypoints of the one or more pilots in the cockpit). The three-dimensional keypoints of the one or more pilots in the cockpit are then fed into a LSTM network model of the posture position module 214. The LSTM network model is configured, e.g., pre-trained, to determine feature relationships between the key points (i.e., the three-dimensional distance and angles between each key point) and to utilise the determined feature relationships to identify a three-dimensional posture. During training, the LSTM network model will learn to recognize or classify different postures based on characteristic/distinctive feature relationships. Accordingly, the LSTM network model is configured, e.g., trained, to recognise/infer postures (e.g., postures including at least head/neck leaning forward, backward, to right, or to left, body leaning to right or to left, normal upright, slouching, sliding down seat, falling off seat, etc.) of the one or more pilots from the three-dimensional keypoints.

Once the pilot posture(s) have been determined by the LSTM network of the pilot posture position module 214, the information is sent to the decision module 120 and/or an alert system/module 215 which may be additionally provided with information from other sensors and subsystems in the system (e.g., from subsystems 112*a-e*). The decision module 120 and/or alert system/module 215 can then determine a final pilot state 130 and decide if an alert needs to be raised.

Figure 3:
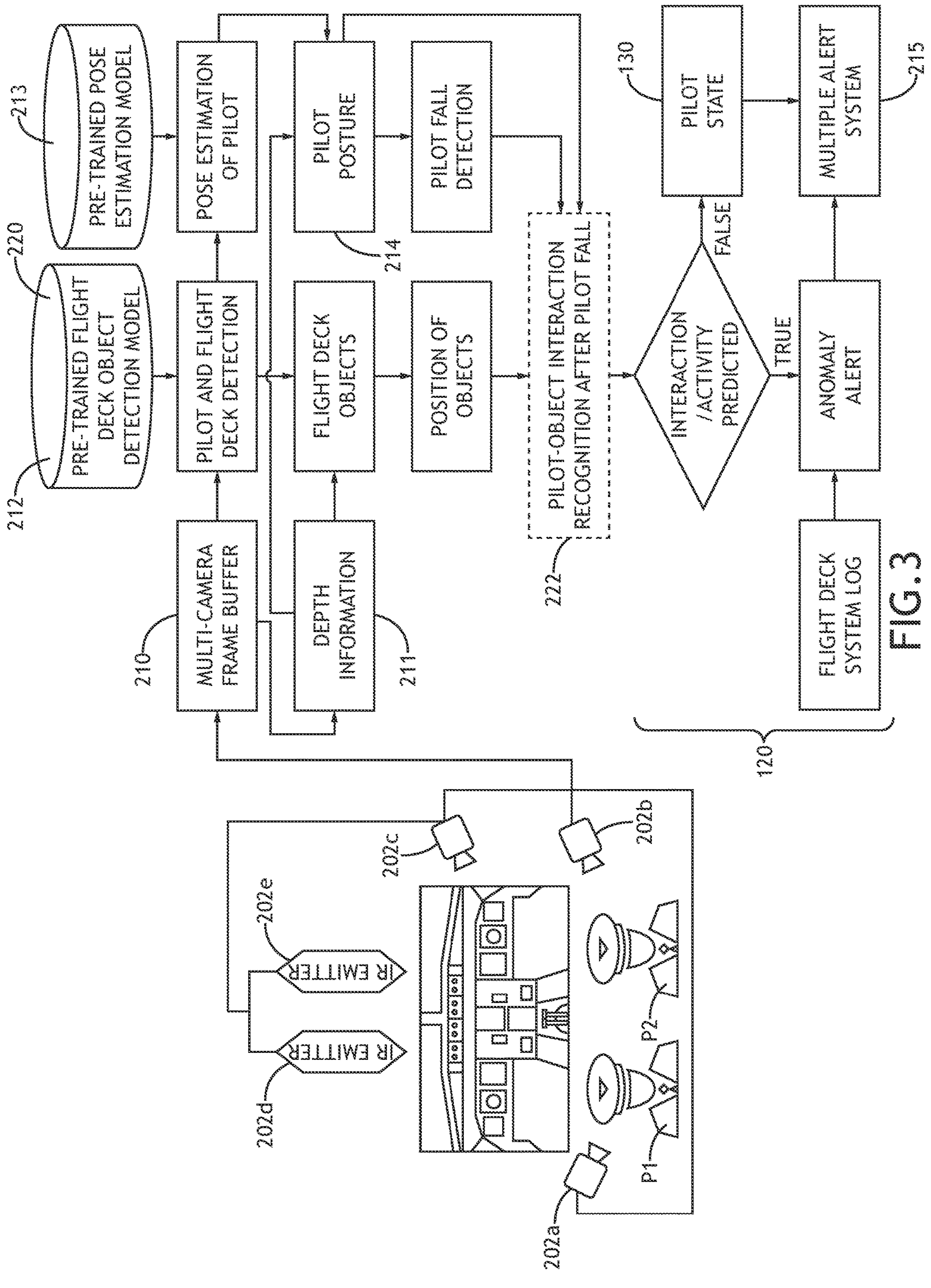
FIG. 3 shows an example of a pilot fall and object interaction detection system, in accordance with one or more embodiments of the present disclosure.
Figure 3:
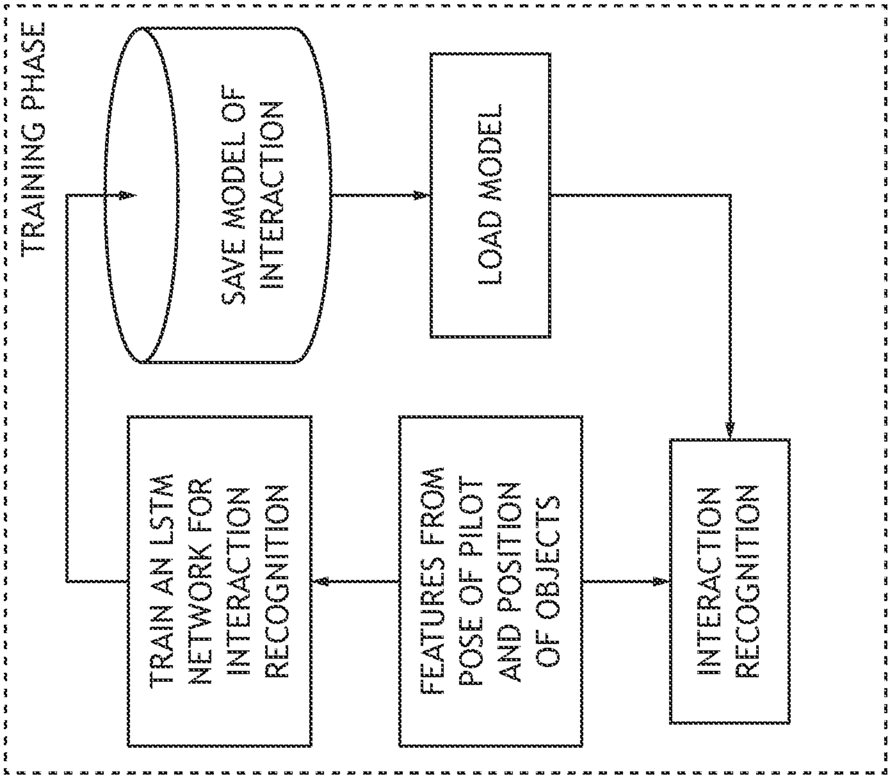

Another exemplary usage of the system is shown in FIG. 3. In this example, as before, the image data provided to the frame buffer 210 is transposed to two different branches. However, in this case, in the second branch the pilot detection module 212 further comprises an object detection module 220 configured to determine a presence of one or more objects in the cockpit (e.g., control levers, control panels including buttons and switches, sidesticks/joysticks, control pedals, and control wheels/yokes/tillers). If the presence of one or more objects are detected, the object detection module 220 utilises the processed image data from the depth information module 211 to create a three-dimensional reconstruction of the scene (e.g., to determine three-dimensional positions of the objects in the cockpit).

In the event that the system determines that one or more pilots have fallen (e.g., the posture position indicates that a pilot is falling/has fallen), the processed image data from the object detection module 220 (e.g., the three-dimensional object positions) and the processed image data from the posture position module 214 (e.g., the three-dimensional postures of the one or more pilots P1, P2) are passed to the pilot-object module 222. The pilot-object interaction module 222, as shown in FIG. 3, comprises an LSTM network configured, e.g., trained, to recognise when a pilot-object interaction has occurred based on the three-dimensional relative positions of the pilot(s) P1, P2 and the objects. Therefore, for example, the pilot-object module 222 is able to determine if a pilot who has fallen (for any reason) has fallen onto or knocked the flight controls.

If the system determines that a pilot-object interaction has occurred after a fall, then this information is passed to the decision module 120 and/or alert system/module 215. The decision module 120 and/or alert system 215 is configured to check the time at which the determined pilot-object interaction event occurred and identify if an action was input to a flight system log at the time of the determined pilot-object interaction event. If an action was input to the flight system log at the same time as a determined pilot-object interaction event, then the alert system 215 is configured to alert an aircraft management system/control system that the action input was a result of the determined pilot-object interaction. Accordingly, the aircraft management system/control system may be instructed to automatically address the action input (e.g., to rectify or undo the action performed by the inadvertent interaction with the flight controls), or notify aircraft crew (e.g., the remaining one or more pilots) and/or ground control and/or Air Traffic Control. Similarly, the alert system 215 may alert aircraft crew and/or ground control and/or Air Traffic Control that one or more pilots have fallen (e.g., even if a pilot-object interaction has not occurred).

In other words, the system 200 is capable of recognising a first anomalous event (e.g., a pilot fall) and instructing the alert system/module 215 to raise a corresponding alert (e.g., to notify at least one of the aircraft management system, aircraft crew, ground control, and Air Traffic Control), and capable of recognising a second anomalous event (e.g., a pilot-object interaction after a pilot fall) and instructing the alert system/module 215 to check if a flight action input was a result of the determined pilot-object interaction and, if so, to raise a corresponding alert (e.g., to notify at least one of the aircraft management system, aircraft crew, ground control, and Air Traffic Control).

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

The invention claimed is:

1. A system comprising:

one or more imaging devices configured to collect image data of a cockpit area of an aircraft;

a pilot detection module configured to determine a presence of one or more pilots in the cockpit area based on the image data, wherein the image data comprises a plurality of key points associated with the one or more pilots; and a pilot posture module configured to:

determine three-dimensional positions for each key point of the plurality of key points associated with the one or more pilots;

determine feature relationships between each key point of the plurality of key points based on a comparison of the three-dimensional positions of the plurality of key points; and determine three-dimensional posture of the one or more pilots based on the feature relationships.

2. The system of claim 1, wherein the pilot posture module is configured to determine that the three-dimensional posture of a pilot of the one or more pilots is falling or has fallen.

3. The system of claim 2, comprising an object detection module configured to determine a presence and three-dimensional position of one or more objects in the cockpit area based on the image data.

4. The system of claim 3, comprising a pilot-object module configured to, if the pilot posture module detects that the three-dimensional posture of the pilot of the one or more pilots has fallen, determine that a pilot-object interaction event has occurred based on the three-dimensional posture of the one or more pilots and the three-dimensional positions of the one or more objects.

5. The system of claim 4, wherein the system is configured to pass at least one of the determined three-dimensional posture or the determined pilot-object interaction event to an alert system.

6. The system of claim 5, wherein the alert system is configured to:

verify that an action has been input into a flight system log of the aircraft as a result of the determined pilot-object interaction event; and alert a control system of the aircraft that the action input was a result of the determined pilot-object interaction event.

7. The system of claim 5, wherein the alert system is configured to:

verify from the pilot posture module that the three-dimensional posture of the one or more pilots have fallen; and alert aircraft crew and/or ground control and/or Air Traffic Control that the three-dimensional posture of one or more pilots have fallen.

8. The system of claim 1, wherein the pilot posture module comprises:

a depth information module configured to extract depth information from the image data; and a pilot pose module configured to identify a plurality of two-dimensional keypoints corresponding to features of the one or more pilots in the image data, wherein the pilot posture module is configured to combine the depth information and the two-dimensional keypoints to determine three-dimensional posture of the one or more pilots in the cockpit.

9. A method comprising:

collecting, using one or more imaging devices, image data of a cockpit area of an aircraft, wherein the image data comprises a plurality of key points associated with one or more pilots;

determining, using a pilot detection module, a presence of one or more pilots in the cockpit area based on the image data;

determining, using a pilot posture module, three-dimensional positions for each key point of the plurality of key points associated with the one or more pilots;

determining, using the pilot posture module, feature relationships between each key point of the plurality of key points based on a comparison of the three-dimensional positions of the plurality of key points;

and determining, using the pilot posture module, three-dimensional posture of the one or more pilots based on the feature relationships.

10. The method of claim 9, comprising:

determining, using the pilot posture module, that the three-dimensional posture of a pilot of the one or more pilots is falling or has fallen.

11. The method of claim 10, comprising:

determining, using an object detection image module, a presence and three-dimensional position of one or more objects in the cockpit area based on the image data.

12. The method of claim 11, comprising:

determining, using a pilot-object module, that a pilot-object interaction event has occurred based on the three-dimensional posture of the one or more pilots and the three-dimensional positions of the one or more objects.

13. The method of claim 12, comprising:

verifying, using an alert system, that an action has been input into a flight system log of the aircraft as a result of the determined pilot-object interaction event; and alerting, using the alert system, a control system of the aircraft that the action input was a result of the determined pilot-object interaction event.

14. The method of claim 10, comprising:

alerting, at least one of an alert system, at least one of aircraft crew, ground control, or Air Traffic Control that the three-dimensional posture of the pilot of the one or more pilots have fallen.

15. The method of claim 9, comprising:

extracting, using a depth information module of the pilot posture module, depth information from the image data;

identifying, using the pilot pose module of the pilot posture module, a plurality of two-dimensional keypoints corresponding to features of the one or more pilots in the image data; and combining, using the pilot posture module, the depth information and the two-dimensional keypoints to determine three-dimensional posture of the one or more pilots in the cockpit.

* * * * *